(12) United States Patent
Varma et al.

(10) Patent No.: US 7,068,639 B1
(45) Date of Patent: Jun. 27, 2006

(54) SYNCHRONIZED PLURAL CHANNELS FOR TIME DIVISION DUPLEXING

(75) Inventors: Subir Varma, San Jose, CA (US); Joseph Hakim, Sunnyvale, CA (US)

(73) Assignee: Aperto Networks, Inc., Milpitas, CA (US)

( * ) Notice: Subject to any disclaimer, the term of this patent is extended or adjusted under 35 U.S.C. 154(b) by 921 days.

(21) Appl. No.: 09/664,029

(22) Filed: Sep. 19, 2000

(51) Int. Cl.
*H04B 7/212* (2006.01)

(52) U.S. Cl. ........................... 370/347; 370/350
(58) Field of Classification Search ............... 370/337, 370/347, 350, 431, 442, 463, 464, 465, 468, 370/503
See application file for complete search history.

(56) References Cited

U.S. PATENT DOCUMENTS

| | | | |
|---|---|---|---|
| 5,082,061 A * | 1/1992 | Dollison ..................... | 166/378 |
| 5,657,325 A | 8/1997 | Lou et al. | |
| 6,016,311 A * | 1/2000 | Gilbert et al. .............. | 370/280 |
| 6,108,314 A * | 8/2000 | Jones et al. ................. | 370/294 |
| 6,151,312 A * | 11/2000 | Evans et al. ................ | 370/338 |
| 6,400,699 B1 * | 6/2002 | Airy et al. .................. | 370/329 |
| 6,683,866 B1 * | 1/2004 | Stanwood et al. .......... | 370/350 |
| 2001/0038620 A1 * | 11/2001 | Stanwood et al. .......... | 370/336 |

FOREIGN PATENT DOCUMENTS

| | | |
|---|---|---|
| DE | 197 28 469 A1 | 7/1999 |
| WO | WO 97/17768 A1 | 5/1997 |
| WO | WO 98/59523 A2 | 12/1998 |
| WO | WO 98/59523 A3 | 12/1998 |
| WO | WO 99/01959 A2 | 1/1999 |
| WO | WO 99/14975 A2 | 3/1999 |
| WO | WO 99/14975 A3 | 3/1999 |
| WO | WO 99/23844 A2 | 5/1999 |
| WO | WO 99/23844 A3 | 5/1999 |
| WO | WO 99/44341 A1 | 9/1999 |
| WO | WO 01/50633 A1 | 7/2001 |
| WO | WO 01/50669 A1 | 7/2001 |

OTHER PUBLICATIONS

Esmailzadeh et al, Quasi-Synchronous Time Division Duplex CDMA, IEEE, pp. 1637-1641, 1994.*
IEEE 802.16 Broadband Wireless Access Working Group, MAC Proposal for IEEE 802.16.1, pp. 1-92, Jan. 2000.*
Seyhan Civanlar and Bharat T. Doshi. "Self-Healing in Wideband Packet Networks". IEEE Network vol. 4 (Jan. 1990), No. 1, New York, pp. 35-39. XP 000113853.

* cited by examiner

*Primary Examiner*—Frank Duong
(74) *Attorney, Agent, or Firm*—Swernofsky Law Group PC

(57) ABSTRACT

A method of managing TDD across plural channels. In the method, frames are synchronized across the plural channels so that upstream frames and downstream frames coincide across the plural channels. Preferable, one channel is assigned to each of plural CPEs. Each CPE receives MAP messages on its assigned channel. A base station controller preferably generates the MAP messages. The MAP messages instruct the CPEs to switch channels so as to receive data bursts. The base station controller preferably includes a centralized scheduler that allocates channels and slots in those channels to the CPEs for receipt of the data bursts. Also, a method of receiving TDD messages. According to the method, CPEs switch channels based on received media access protocol messages so as to receive data bursts on plural channels. The channel to which a CPE switches need not be the same channel as the one on which the CPE receives its MAP messages. Additionally, systems, base stations, CPEs, and/or software that utilizes and/or implements these methods.

6 Claims, 4 Drawing Sheets

SYNCHRONIZED PLURAL CHANNELS FOR TIME DIVISION DUPLEXING

BACKGROUND OF THE INVENTION

1. Field of the Invention

This invention relates to communication that uses time division duplexing (TDD) for multiple communication channels. In particular, the invention relates to synchronizing the duplexing across the plural channels, and further to assigning slots for time division multiple access (TDMA) in those channels such that consumer provided equipment (CPE) dynamically switches channels.

2. Description of the Related Art

Time division duplexing (TDD) is a well-known technique for bi-directional communication over a single frequency channel. In TDD, the channel is temporally divided into alternating upstream and downstream frames. Communication between a base station and several consumer provided equipment (CPEs) can share a single TDD channel through use of time division multiple access (TDMA). In TDMA, the upstream frames and the downstream frames are subdivided into plural slots. The base station allocates these slots among the CPEs. At a start of each downstream frame (i.e., from the base station to the CPEs), the base station sends data to the CPEs about the slot allocation, usually using media access protocol (MAP) messages.

Sometimes, a base station communicates with plural CPEs using TDMA on plural channels. Conventionally, each CPE is assigned to a channel, and the CPE receive MAP and data bursts and sends data bursts only on its assigned channel. This arrangement is shown in FIG. 4.

CPEs A to H in FIG. 4 communicate using TDMA on channels A to D. Frames are not synchronized between channels, as illustrated by the staggered arrangement of the upstream and downstream frames between the channel.

In FIG. 4, CPEs A and B are assigned to channel A, CPEs C and D are assigned to channel B, CPEs E and F are assigned to channel C, and CPEs G and H are assigned to channel D. Thus, CPEs A and B receive downstream MAP and data bursts from a base station and send upstream data bursts to the base station on channel A. CPEs C and D receive downstream MAP and data bursts from the base station and send upstream data bursts to the base station on channel B. CPEs E and F receive downstream MAP and data bursts from the base station and send upstream data bursts to the base station on channel C. CPEs G and H receive downstream MAP and data bursts from the base station and send upstream data bursts to the base station on channel D.

As shown in FIG. 4, some of the channels are used to full capacity, preventing additional data from being sent or received on those channels. For example, CPEs A and B cannot send additional data to the base station on channel A because the upstream frame of the channel is already fully utilized. Likewise, CPE F cannot send or receive data using channel C because CPE E is fully utilizing channel C. At the same time, some of the slots in the channels in FIG. 4 are unused. Thus, conventional channel and slot allocation can be inefficient and can lead to communication delays.

SUMMARY OF THE INVENTION

Accordingly, what is needed is a system that more efficiently utilizes plural channels in a TDD environment.

The invention addresses the foregoing need by synchronizing frames across the plural channels so that upstream frames and downstream frames coincide across the plural channels. As a result, slots in all of the synchronized channels are available for use when a CPE needs to upload data to a base station. Likewise, slots in all of the synchronized channels are available for use when the base station needs to download data to a CPE. A controller in the base station can allocate channels and slots in those channels to the various CPEs so as to send or to receive data using slots that would otherwise be unused, thereby more efficiently utilizing the plural channels.

Accordingly, in one embodiment the invention is a method of managing TDD across plural channels. In the method, frames are synchronized across the plural channels so that upstream frames and downstream frames coincide across the plural channels.

Preferable, one channel is assigned to each of plural CPEs. Each CPE receives MAP messages on its assigned channel. A base station controller preferably generates the MAP messages. The MAP messages instruct the CPEs to switch channels so as to receive data bursts. The base station controller preferably includes a centralized scheduler that allocates channels and slots in those channels to the CPEs for receipt of the data bursts.

In another aspect, the invention is a method of receiving TDD messages. According to the method, CPEs switch channels based on received MAP messages so as to receive data bursts on plural channels. The channel to which a CPE switches need not be the same channel as the one on which the CPE receives its MAP messages.

By virtue of the foregoing operations, the invention allows for more efficient use of channels in a TDMA environment. In particular, if a first channel on which a CPE receives MAP messages is full, a base station can allocate a slot in another channel to the CPE. The use of a centralized scheduler facilitates this cross-channel slot allocation.

The invention also can be embodied in communication systems, base stations and/or CPEs that utilize the foregoing methods. Other possible embodiments of the invention include software for implementing the foregoing methods. Additional embodiments of the invention are possible.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

In the following description, a preferred embodiment of the invention is described with regard to preferred steps and data. However, those skilled in the art would recognize, after perusal of this application, that embodiments of the invention may be implemented using one or more general purpose processors or special purpose processors adapted to particular steps and data operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the preferred steps and data described herein using such equipment would not require undue experimentation or further invention.

Figure 1:
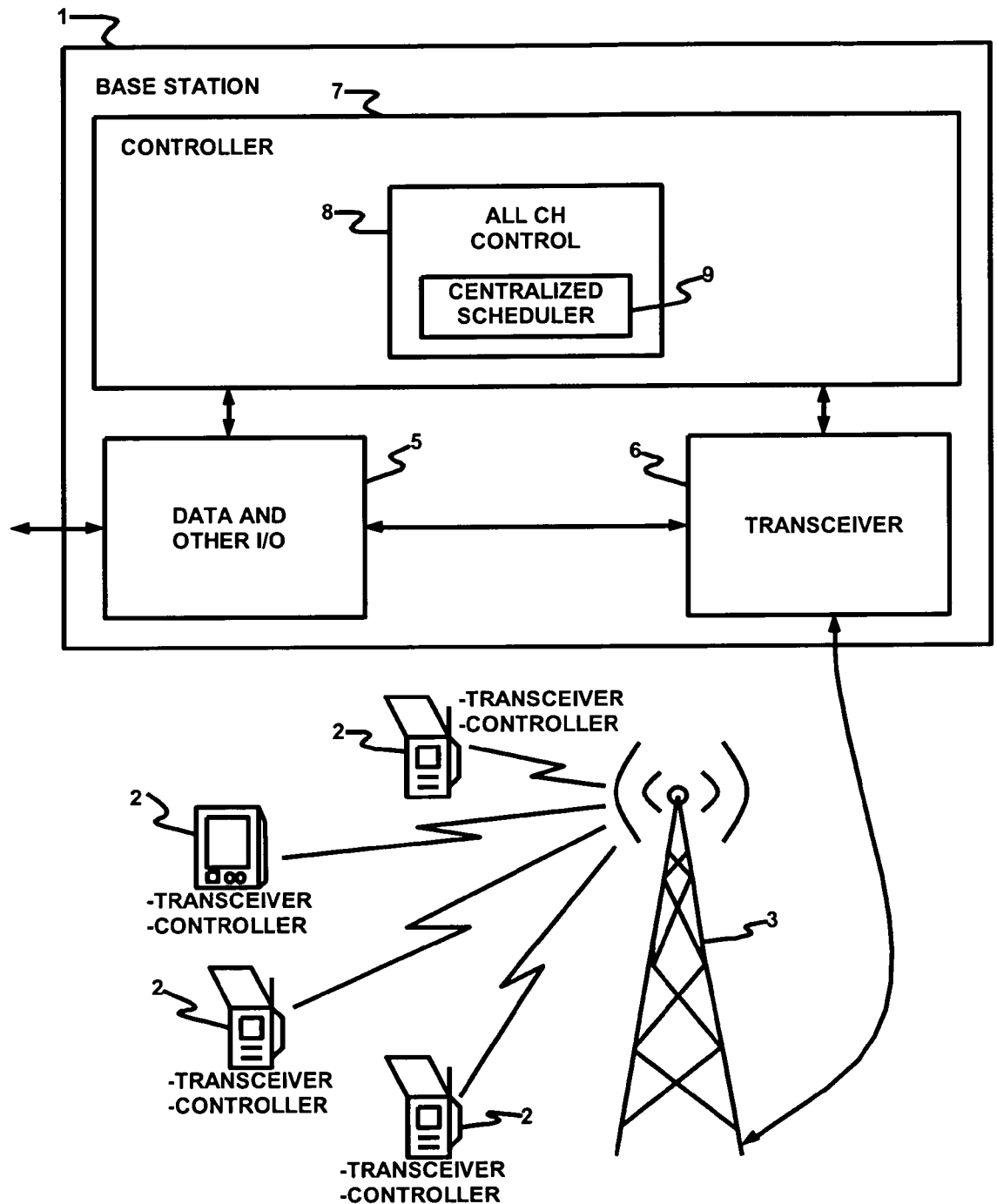
FIG. 1 shows a communication system in which the invention can be implemented, including a base station and plural CPEs.

FIG. 1 shows a communication system in which the invention can be implemented, including a base station and plural consumer provided equipment (CPEs). In FIG. 1, base station 1 communicates with CPEs 2 using antennae 3. Examples of CPEs 2 include wireless digital phones, personal data assistants (PDAs) with wireless modems, and other devices that can utilize time division duplexing (TDD). Preferably, CPEs 2 include at least transceivers that can dynamically switch between plural channels and controllers for controlling the transceivers.

Base station 1 preferably includes at least data and other I/O 5 for sending data to and receiving data from an outside source. Examples of the outside source include, but are not limited to, a computer network, a long-distance or local telephone network, a data network, and the World Wide Web. Base station 1 preferably also includes transceiver 6 for transmitting and receiving signals over plural channels using antenna 3.

Data and other I/O interface 5 and transceiver 6 are controlled by controller 7 of base station 1. Controller 7 preferably includes at least a memory and a processor (both not shown). The memory can be a fixed memory such as DRAMs, SRAMs, hard disks, caches, etc., or removable memory such as floppy disks, CD-ROMs, data tapes, etc, or any combination of these memories. The memory preferably stores information including instructions executable by the processor and data for use during execution of those instructions. According to the invention, this data preferably includes at least a schedule of slot allocations across synchronized frames for plural channels and data for constructing media access protocol (MAP) messages for plural CPEs.

Preferably, controller 7 implements all channel control 8 for controlling communications with CPEs 2 over plural channels. Channel control 8 preferably includes centralized scheduler 9 that allocates channels and slots in those channels to CPEs 2.

Figure 2:
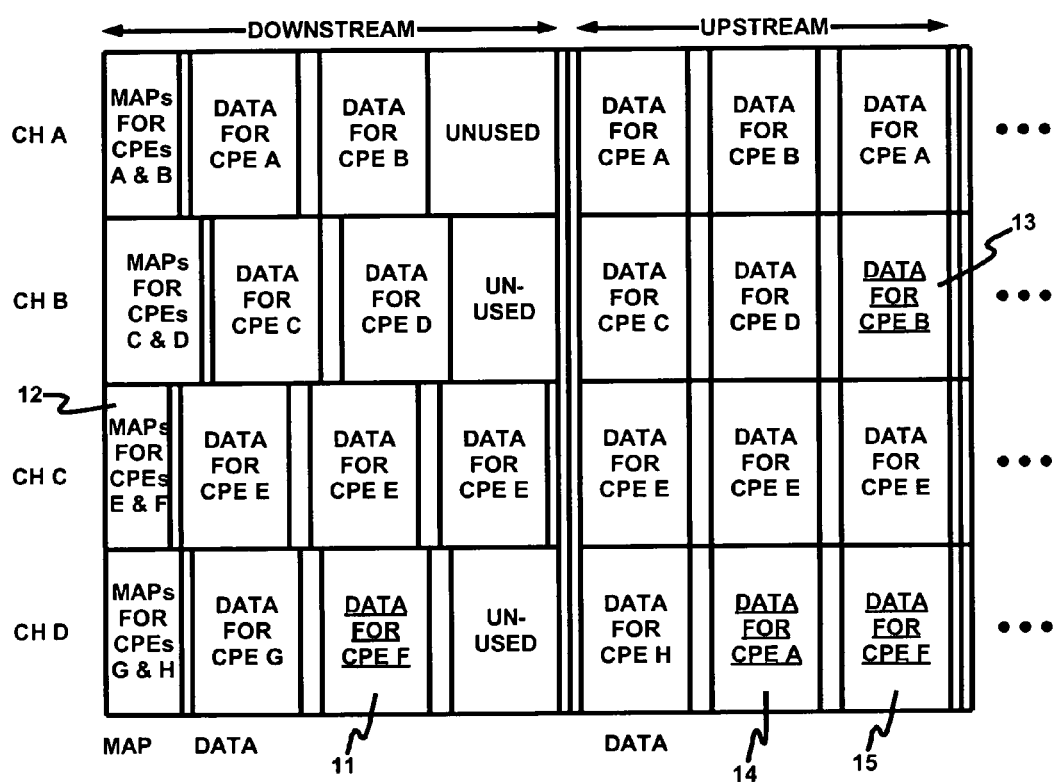
FIG. 2 shows frame synchronization and cross-channel slot allocation according to the invention.

FIG. 2 shows frame synchronization and cross-channel slot allocation according to the invention.

Briefly, according to the invention, frames are synchronized across the plural channels so that upstream frames and downstream frames coincide across the plural channels. One channel is assigned to each of plural CPEs. Each CPE receives MAP messages on its assigned channel. Based on received MAP messages, CPEs switch channels so as to receive data bursts. The channel to which a CPE switches need not be the same channel as the one on which the CPE receives its MAP messages.

In more detail, CPEs A to H in FIG. 2 communicate with a base station (not shown) using TDMA on channels A to D. Downstream and upstream frames are synchronized across the plural channels. In other words, when one channel is being used for downstream messages (e.g., from base station 1 to CPEs 2), the other channels also are being used for downstream messages. When one channel is being used for upstream messages (i.e., from CPEs 2 to base station 1), the other channels also are being used for upstream messages.

Base station controller 7 allocates channels and slots in those channels to the CPEs, preferably using centralized scheduler 9 of all channel control 8. Then, base station controller 7 constructs MAP messages for the CPEs and sends those MAP messages to the CPEs on their assigned channels. Thus, in FIG. 2, MAP messages for CPEs A and B are downloaded to CPEs A and B on channel A, messages for CPEs C and D are downloaded to CPEs C and D on channel B, MAP messages for CPEs E and F are downloaded to CPEs E and F on channel C, and MAP messages for CPEs G and H are downloaded to CPEs G and H on channel D. Then, the various CPEs switch to the allocated channels for receiving (downloading) and sending (uploading) data in the subsequent downstream and upstream frames.

Because the upstream and downstream frames are synchronized, a CPE can switch to any one of the channels to send or to receive data. In addition, the CPEs receive MAP messages all at once, so they can switch in concert to utilize available channel slots more efficiently.

For example, in FIG. 2, data bursts to CPE E are going to fully utilize the downstream frame of channel C, leaving no slots for downloading data to CPE F on channel C. If data is going to be available for downloading to CPE F, base station 1 can allocate slot 11 in channel D to CPE F. This allocation is performed by base station controller 7, which informs CPE F of the allocation in MAP message 12.

Likewise, base station controller 7 can allocate slots for uploading data from CPEs across the channels. Thus, in FIG. 2, slot 13 in channel B has been allocated to CPE B, slot 14 in channel D has been allocated to CPE A, and slot 15 in channel D has been allocated to CPE F.

As shown in FIG. 2, slots in plural channels can be allocated to a single CPE. Slots can be allocated both on the channel on which the CPE receives its MAP messages and on other channels. For example, slots in channels A and D have been allocated to CPE A in FIG. 2. Slots need not be allocated to a CPE on the channel on which the CPE receives its MAP messages. Thus, CPE F receives its MAP message on channel C and its data burst on channel D. Any other combinations of channel and slot allocations are possible according to the invention.

The example shown in FIG. 2 is provided only for illustrative purposed. The invention is not limited to the number and/or arrangement of channels, slots, CPEs, data bursts, MAP messages, and other details shown in FIG. 2. Instead, the invention encompasses any multichannel TDD communications in which frames are synchronized across channels, and such communications in which slots can be allocated across channels.

Figure 3:
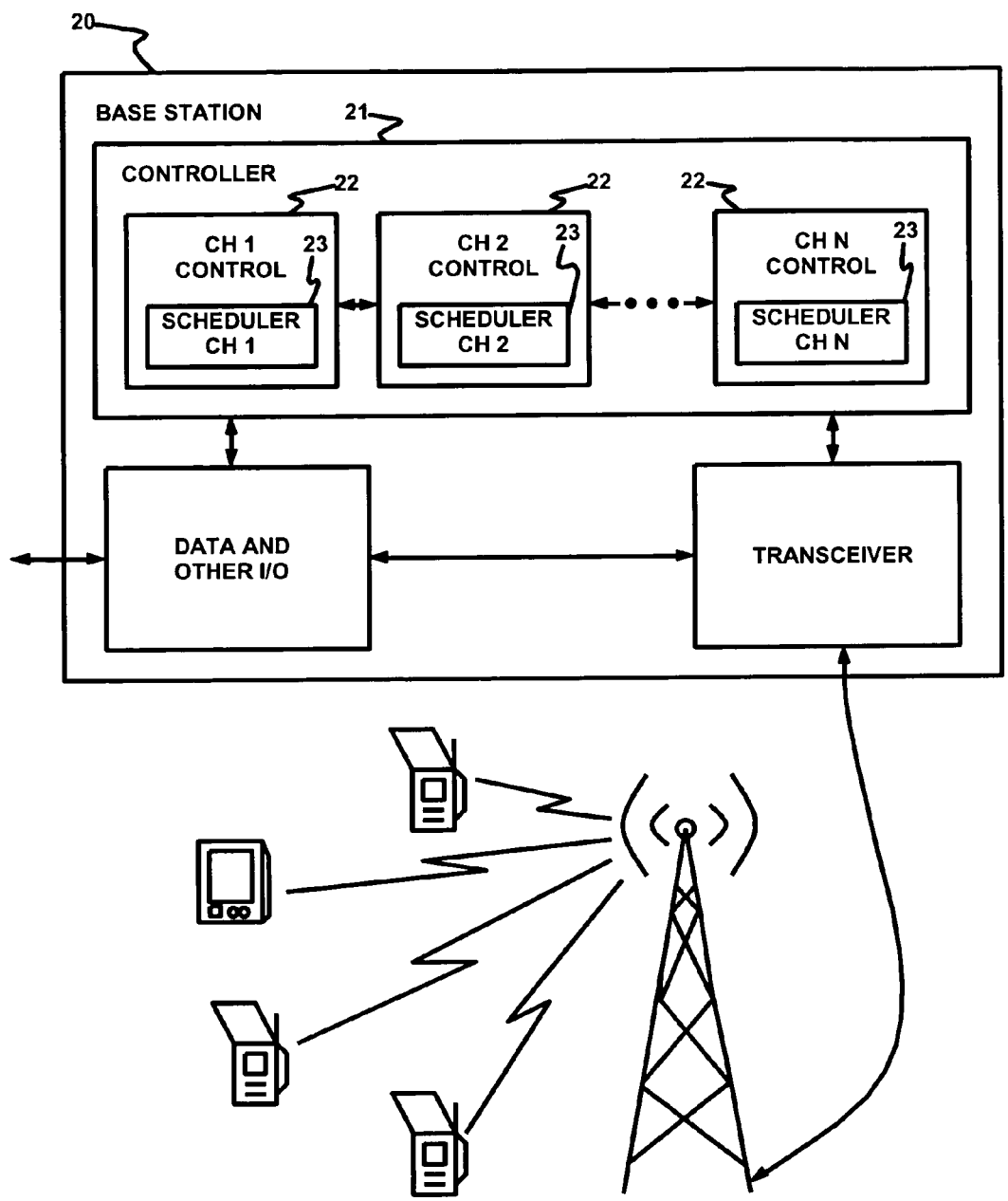
FIG. 3 shows a communication system in which the invention can be implemented, including an alternative implementation of the base station.
Figure 4:
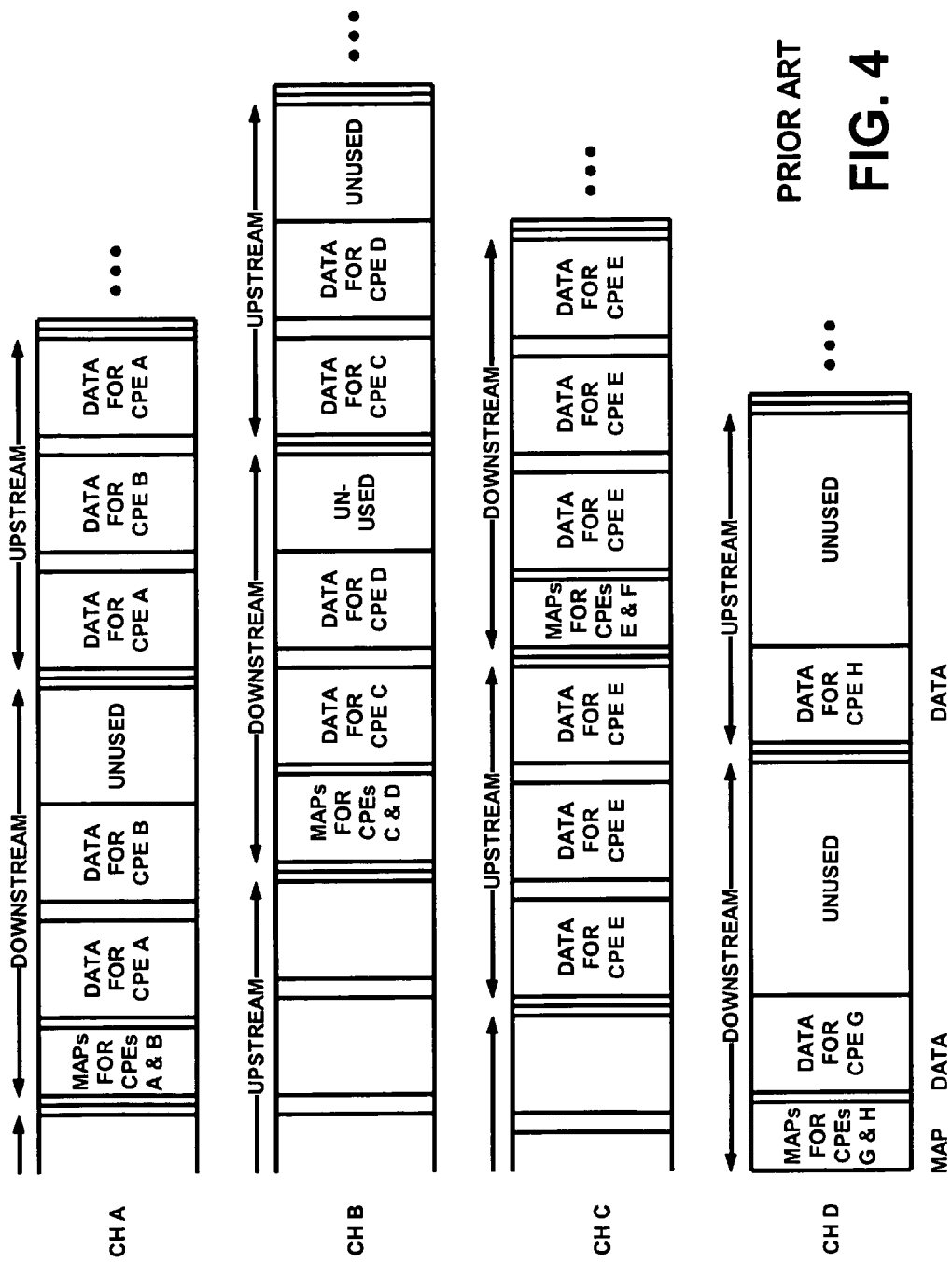
FIG. 4 shows channel slot allocation according to the prior art, in which channels are not synchronized.

FIG. 3 shows another communication system in which the invention can be implemented, including an alternative implementation of the base station. In FIG. 3, a centralized scheduler and all channel control are not utilized by base station 20. Instead, controller 21 includes plural channel controllers 22, each with its own scheduler 23. In this embodiment of the invention, the channel controllers intercommunicate so as to determine slot allocation. One advantage of this embodiment is that more conventional hardware can be utilized, with a majority of the invention implemented in revised software.

Alternative Embodiments

Although preferred embodiments of the invention are disclosed herein, many variations are possible which remain within the content, scope and spirit of the invention, and these variations would become clear to those skilled in the art after perusal of this application. For example, while the plural channels discussed above are plural frequency channels, the invention is equally applicable to situations where plural different physical channels (i.e., wires or fiber optics) are utilized, and to combinations of these frequency and physical channels. In addition, while the invention is disclosed above in a base station/CPE context, the invention is equally applicable to other point-to-multipoint communications. Other variations are possible.

What is claimed is:

1. A method of receiving time division duplexed messages comprising the steps of:
    switching channels based on received media access protocol messages so as to receive data bursts on plural channels;
    receiving a first media access protocol message at a CPE over a first time division multiple access channel, the media access protocol message instructing the CPE to receive a data burst over a second time division multiple access channel, the second channel being different from the first channel; and
    receiving the data burst at the CPE over the second time division multiple access channel;
    wherein the step of switching comprises switching from the first time division multiple access channel to the second time division multiple access channel in response to the media access protocol message.

2. A method as in claim 1, wherein the first media access protocol message further instructs the CPE to send upstream data to a base station over the second time division multiple access channel, the method further comprising:
    sending an upstream data burst from the CPE to the base station over the second time division multiple access channel.

3. A method as in claim 2, wherein the step of receiving the data burst is performed during a first downstream frame, the step of sending is performed during a second upstream frame that immediately follows the first downstream frame so that there are no frames between the first downstream frame and the second upstream frame.

4. A method as in claim 2, further comprising:
    synchronizing the upstream data burst from the CPE with another upstream data burst from another CPE.

5. A method as in claim 2, wherein the first media access protocol message further instructs another CPE to send upstream data to the base station over the first time division multiple access channel, the method further comprising:
    synchronizing the upstream data burst from the CPE with an upstream data burst from said another CPE.

6. A method as in claim 1, wherein the steps of receiving a first media access protocol message and receiving the data burst are performed during the same downstream frame.

* * * * *